H. D. Storer,
Wood Molding Machine.
No. 29,727. Patented Aug. 21, 1860.
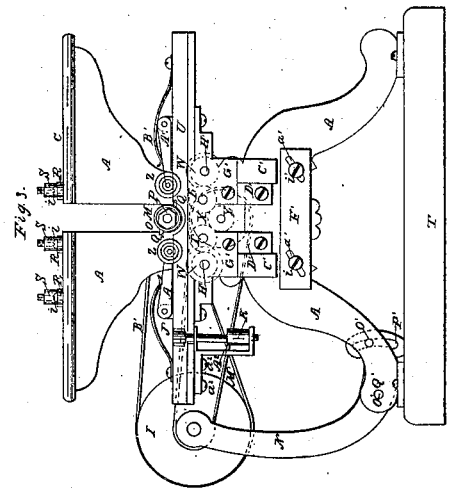
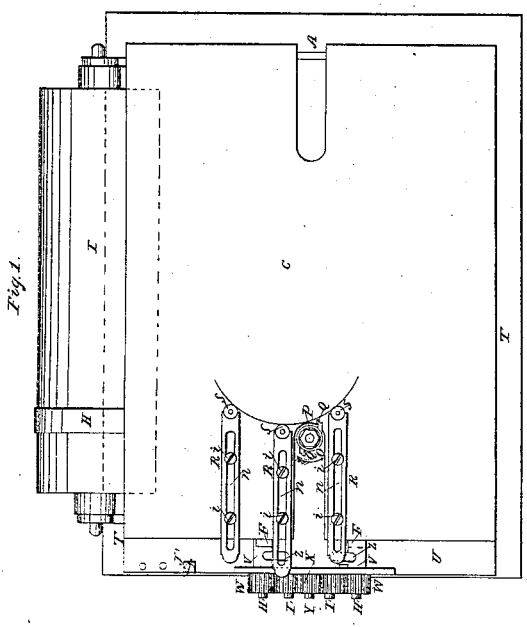
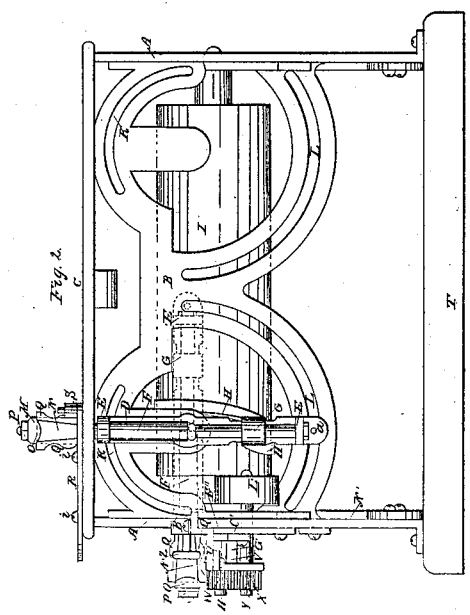
Witnesses:
Joshua J. Fuller
J. L. Lamb
Inventor:
Henry Cost
By atty &c.

UNITED STATES PATENT OFFICE.

HENRY D. STOVER, OF NEW YORK, N. Y.

SHAPING AND MOLDING MACHINE.

Specification of Letters Patent No. 29,727, dated August 21, 1860.

*To all whom it may concern:*

Be it known that I, HENRY D. STOVER, of the city, county, and State of New York, have invented a new and useful Double Combined Shaping and Molding Machine; and I hereby declare that the following specification, in connection with the accompanying drawings and letters of reference marked thereon, constitute a lucid, clear, and exact description of the construction and use of the same.

In referring to the said drawings, Figure 1 denotes a plan or top view. Fig. 2 a front side elevation of the same. Fig. 3 an end elevation of it. Fig. 4, an end elevation of carriage cam, feed roll, and shaft.

*Invention.*—The nature of my invention consists in so constructing my machine that the same arbor and cutter head may be used vertically or horizontally, or any intermediate angle, without removing it from its journal boxes. 2d. In combining elastic pressure rings and shafts above and fluted metallic feed rolls beneath; with cutter head to shape the molding. 3d. Raising and lowering the carriage automatically, while the cutter head is revolving, to cut a ribbed, serpentine, or crooked molding. 4th. The peculiar construction of cutter head, so that the flat cutters will give a shearing stroke or cut. 5th. Combining three movable and adjustable guides, to guide curved pieces to cutter heads, and be shaped without a pattern. 6th. In so constructing my machine that the same cutter head may cut curved, straight, and ribbed or serpentine moldings without removal from the same shaft.

*Construction.*—To enable persons skilled in the art to which my invention appertains to construct and carry out the same I will describe it as follows: I construct an iron frame A, in two end pieces, and unite them by cross bar B, and supported by pedestal T. To the top of this frame I secure a table C. I construct a stand seen at D, which is pivoted to cross bar B, so as to swing freely and be secured in a perpendicular position, or be turned down and be secured in a horizontal, or any intermediate position, seen in red lines at Fig. 2. To this stand I secure two journal boxes seen at E, in which the shaft F, which carries the cutter head M, is suspended to revolve freely and is driven by pulley G and belt H, from drive cylinder I. The curved slots K, and L, are formed through cross bar B, to receive and allow the screws *a*, of stand D, and the stand and cutter head itself to swing from a perpendicular, to a horizontal or any intermediate angle and be firmly secured at once by the screws *a*, at the top and bottom of stand D, these screw heads being on the back side are not shown.

The central portion of cutter head is beveled from a thick bottom, or at lower end of cutters, to quite thin at the top. I fit a holder N, to each of the beveled sides of cutter head M, which are held thereto by being dovetailed to cutter head and to top ring O. Then a piece of iron is placed between the holders N, and central part M, and the nut P, turned snugly against collar or top ring O, which makes all secure. Then the cutter head is put into an engine lathe and turned a straight round cylinder and polished, after which the pieces of iron are removed from between holders N, and cutter head, and cutters Q are placed therein and secured by nut P. By this construction and arrangement the cutters are conveniently made of thin flat steel, and are secured by pressure against their flat sides only, and yet impart a shearing or drawing stroke or cut to the material receiving shape, whether it be a molding fed over a carriage or a piece held to the cutters by hand, when the shaft and cutter head are operating perpendicularly.

Three movable guide bars seen at R, are secured to the top of table C by means of screws *i*. These guides have rolls S, pivoted at one of their ends so as to freely turn, and against which a piece may be placed and shaped any desired curve by cutter head M by changing the relative position of guide rolls S, by means of slots *u*, in guide bars R. Either or any of the guides S may be moved elastically, if desired in feeding the material along. It will be seen that my machine is double; and that two sets of cutter heads, carriages and appendages can be used if desired all on the same frame and at the same time.

My machine is constructed so that the same shaft and cutter head is used perpendicularly and horizontally or in any intermediate position, and is changed to and secured in any such positions with the greatest celerity; thus the same cutters form a straight and curved molding of precisely the same shape, and where such moldings are to be combined, as in arched window and door frames the joint is imperceptible from the exactness of the fit. This could not be accomplished where two different cutter heads have to be used as is now the case, one for straight and one for curved moldings.

I construct a carriage seen at U, and placed level at one end, or each end of my machine. This carriage is for passing over and guiding the rough material being shaped into the molding by the same cutter head M, and shaft F, lowered to, and operating in a horizontal position as seen in red lines at Fig. 2. I construct two fluted or notched feed rolls seen at V, and suspended on shafts H′ so as to freely revolve in carriage U, and these shafts have a gear fastened to each of their outer ends, seen at W, which are driven by gear X, on main feed shaft Y, by intermediate gears I′ and pulley L′ and belt M′ from main shaft I.

The feed rolls V project upward through slots cut in carriage U, to receive them; sufficient to feed along the piece for the molding. Elastic pressure rolls are made as seen at Z, their central part being metallic and their periphery of some elastic material, and of proper form to not mar or deface the finished molding. These pressure rolls are each suspended by and to a swinging arm A′, held down by a spring B′, and they, the rolls, come in contact with the piece, nearer the cutter head, than the feed rolls which forces the piece down close and firm upon the carriage just where the cutter head is imparting the finish and shape. This is important as a very smooth molding is thus produced, by the solidity of its foundation when being formed.

The carriage U, is attached to slides C′, so as to move vertically and freely. These slides being guided by ways D′, underneath the slides C′, is placed a horizontal plate F′ on which rest the slides C′ and the carriage U. This plate can be raised or lowered by its angular slots $a'$ and screws $i'$ as desired.

I construct two cams or eccentrics F″ and secure one to each back end of feed roll V, and which come in contact, when turning, with stationary arms G′ on ways D′, so that when the plate F′, is lowered to bring these cams into action they will alternately raise and lower the carriage and thus form a serpentine or ribbed molding of any shape or depth by a simple change of gear X, and replace by larger or smaller one, or the plate F′ can be raised and the carriage made stationary for shaping straight moldings as will be readily seen. Thus curved, straight, sinuous or serpentine moldings can all be made on my machine with the same cutters and cutter head, operating on the same shaft.

I place two edge finishing cutter heads J′, in the carriage U, and driven by belt on pulley K′, and made laterally adjustable by stand $A^2$ and screws $a^2$, so as to nicely trim both edges of the molding and bring them to the same width. The outer cutter head is adjustable laterally as above mentioned for the different width of moldings.

The drive cylinder I, is suspended to swing or move laterally by stands N′, hinged to frame A, at Q′, these stands can be secured in any desired position by screws O′, and slots P′.

The stands N′, allow the drive belt M′, to remain at the same tension whether the cutter head be operating perpendicular or horizontal or any angle.

Having thus described my invention I will state my claim as follows:

What I claim as my invention and desire to secure by Letters Patent is—

1. So constructing and arranging the several parts of my machine that the same arbor and cutter head may be used vertically or horizontally or any intermediate angle, and be moved to any such position, with great celerity and firmly secured therein to shape the various moldings or substances, with the same head and cutters, essentially in the manner as within described.

2. Combining the laterally adjustable pressure rolls, with the feed rolls and cutter head, so that the axes of the former shall lie between planes perpendicular to the bed of the carriage and passing through the axes of feed rolls and cutter head, substantially as, and for the purpose set forth.

3. The vertically moving carriage U with its slides C′, in combination with the slotted plate F′, arms G′ and cams F″ upon feed roll shaft; arranged and operating substantially as specified.

4. Forming the recesses for the cutters in a cylindrical cutter head with their beds obliquely or angularly inclined to the axis of the shaft.

5. The longitudinally adjustable guides R′ upon the table C when combined with the hereinbefore described cutter head; operating as and for the purpose set forth.

HENRY D. STOVER.

Witnesses:
E. W. SCOTT,
TEMPLE TEBBETTS.